(12) United States Patent
Erle et al.

(10) Patent No.: US 6,779,008 B1
(45) Date of Patent: Aug. 17, 2004

(54) METHOD AND APPARATUS FOR BINARY LEADING ZERO COUNTING WITH CONSTANT-BIASED RESULT

(75) Inventors: Mark Erle, Poughkeepsie, NY (US); Michael R. Kelly, LaGrangeville, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/559,939

(22) Filed: Apr. 27, 2000

(51) Int. Cl.[7] .............................. G06F 7/00; G06F 7/38
(52) U.S. Cl. ..................... 708/211; 708/205; 708/501
(58) Field of Search .............................. 708/205, 211, 708/495, 501, 503, 505

(56) References Cited

U.S. PATENT DOCUMENTS

| | | | | |
|---|---|---|---|---|
| 4,841,467 A | * | 6/1989 | Ho et al. ................... | 708/501 |
| 5,091,874 A | * | 2/1992 | Watanabe et al. ........... | 708/211 |
| 5,867,413 A | * | 2/1999 | Yeh .............................. | 708/501 |
| 5,923,575 A | * | 7/1999 | Efrat et al. .................. | 708/205 |
| 6,477,552 B1 | * | 11/2002 | Ott .............................. | 708/211 |

* cited by examiner

*Primary Examiner*—Chuong Dinh Ngo
(74) *Attorney, Agent, or Firm*—Anthony V. S. England; Mark E. McBurney; Bracewell & Patterson, L.L.P.

(57) ABSTRACT

A method of determining a biased leading-zero count for a floating-point operation is disclosed. First, a binary vector is divided into subvectors. Then, multiple subvector leading-zero counts are generated. The subvector leading-zero counts are biased by a constant amount. Next, one or more prefix bits are calculated. Finally, at least a portion of a selected subvector leading-zero count is concatenated to the prefix bits to yield a total leading-zero count for the binary vector.

15 Claims, 8 Drawing Sheets

METHOD AND APPARATUS FOR BINARY LEADING ZERO COUNTING WITH CONSTANT-BIASED RESULT

BACKGROUND OF THE INVENTION

1. Field of the Invention

The present invention generally relates to computer systems, more specifically to a method of determining the number of leading zeros (or ones) in a binary value for computational processing, and particularly for providing an encoded leading-zero count augmented by a constant bias value.

2. Description of Related Art

The basic structure of a conventional computer system includes a central processing unit (CPU) or processor which is connected to several peripheral devices, including input/output (I/O) devices such as a display monitor and keyboard for the user interface, a permanent memory device (such as a hard disk or floppy diskette) for storing the computer's operating system and user programs, and a temporary memory device (such as random-access memory or RAM) that is used by the processor to carry out program instructions. A processor communicates with the peripheral devices by various means, including a bus or a direct channel. A computer system may have many additional components such as serial and parallel ports for connection to, e.g., modems or printers. Those skilled in the art will further appreciate that there are other components that might be used in conjunction with the foregoing; for example, a display adapter connected to the processor might be used to control a video display monitor, and a memory controller may be used as an interface between the temporary memory device and the processor.

A typical processor configuration is shown in FIG. 1. Processor 1 includes a bus interface unit 2 which controls the flow of data between processor 1 and the remainder of the data-processing system (not shown). Bus interface unit 2 is connected to both a data cache 3 and an instruction cache 4. Instruction cache 4 supplies instructions to branch unit 5, which determines what sequence of instructions is appropriate given the contents of general-purpose registers (GPRs) 6 and floating-point registers (FPRs) 7 in processor 1, the availability of load/store unit 8, fixed-point execution unit 9, and floating-point execution unit 10, and the nature of the instructions themselves. Branch unit 5 forwards the ordered instructions to dispatch unit 11, which issues the individual instructions to the appropriate execution unit (load/store unit 8, fixed-point execution unit 9, or floating-point execution unit 10).

Fixed-point execution unit 9 reads data from and writes data to general-purpose registers 6. Floating-point execution unit 10 reads data from and writes data to floating-point registers 7. Load/store unit 8 reads data from general-purpose registers 6, or floating-point registers 7, and writes the data to data cache 3 or to an external memory (not shown) depending on the memory hierarchy and caching protocol employed by the data-processing system, which are beyond the scope of the present invention. Load/store unit 8 also reads data from data cache 3 and writes the data to general-purpose registers 6 and floating-point registers 7.

A processor can perform arithmetic operations on different types of numbers, or operands. For example, the simplest operations involve integer operands, which are represented using a "fixed-point" notation. Non-integers are typically represented according to a "floating-point" notation. Standard number 754 of the Institute of Electrical and Electronics Engineers (IEEE) sets forth particular formats which are used in most modern computers for floating-point operations. For example, a "single-precision" floating-point number is represented using a 32-bit (one word) field, and a "double-precision" floating-point number is represented using a 64-bit (two-word) field. Most processors handle floating-point operations with a floating-point unit (FPU).

Floating-point notation (which is also referred to as exponential notation), can be used to represent both very large and very small numbers. A floating-point notation has three parts, a mantissa (or significand), an exponent, and a sign (positive or negative). The mantissa specifies the digits of the number, and the exponent specifies the magnitude of the number, i.e., the power of the base which is to be multiplied with the mantissa to generate the number. For example, using base 10, the number 28330000 would be represented as 2833E+4, and the number 0.054565 would be represented as 54565E-6. Since processors use binary values, floating-point numbers in computers use 2 as a base (radix). Thus, a floating-point number may generally be expressed in binary terms according to the form $$n = (-1)^s \times 1.F \times 2^E,$$

where n is the floating-point number (in base 10), S is the sign of the number (0 for positive or 1 for negative), F is the fractional component of the mantissa (in base 2), and E is the exponent of the radix. In accordance with IEEE standard 754, a single-precision floating-point number uses the 32 bits as follows: the first bit indicates the sign (S), the next eight bits indicate the exponent offset by a bias amount of 127 (E+bias), and the last 23 bits indicate the fraction (F). So, for example, the decimal number ten would be represented by the 32-bit value 0 10000010 01000000000000000000000 as this corresponds to $(-1)^0 \times 1.01_2 \times 2^{130-127} = 1.25 \times 2^3 = 10$.

When a value is expressed in accordance with the foregoing convention, it is said to be normalized, that is, the leading bit in the significand is nonzero, or a "1" in the case of a binary value (as in "1.F"). If the explicit or implicit most significant bit is zero (as in "0.F"), then the number is said to be unnormalized. Unnormalized numbers can easily occur as an output result of a floating-point operation, such as the effective subtraction of one number from another number that is only slightly different in value. The fraction is shifted left (leading zeros are removed from the fraction) and the exponent adjusted accordingly; if the exponent is greater than or equal to $E_{min}$ (the minimum exponent value), then the result is said to be normalized. If the exponent is less than $E_{min}$, an underflow has occurred. If the underflow is disabled, the fraction is shifted right (zeros inserted) until the exponent is equal to $E_{min}$. The exponent is replaced with "000" (hexadecimal), and the result is said to be denormalized. For example, two numbers (having the same small exponent E) may have mantissas of 1.010101 and 1.010010, and when the latter number is subtracted from the former, the result is 0.000011, an unnormalized number. If E<5, the final result will be a denormalized number.

The hardware of many conventional computers is adapted to process only normalized numbers. Therefore, when a denormalized number is presented as an output result of a floating-point operation, it must be normalized before further processing of the number can take place. Various techniques are used to normalize the values, generally by removing leading zeros from the fraction and accordingly decrementing the exponent. See U.S. Pat. No. 5,513,362.

One technique involves leading zero anticipator (LZA) logic which predicts the number of zeros to remove before the floating-point arithmetic is completed. See IBM Journal of Research and Development, vol. 34, no. 1 (January 1990), pp. 71–77.

Referring to FIG. 2, a high-level block diagram of a conventional construction for floating-point execution unit 10 is illustrated. Floating-point execution unit 10 includes three inputs 202, 204, and 206 for receiving input operands A, B, and C, respectively, expressed as floating-point numbers. Floating-point execution unit 10 uses these operands to perform a "multiply-add" instruction. The multiply-add instruction executes the arithmetic operation $\pm[(A \times C) \pm B]$. The exponent portions of operands A, B, and C received at inputs 202, 204, and 206 are provided to an exponent calculator 208. The mantissa portions of operands A and C are provided to a multiplier 212, while the mantissa portion of operand B is provided to an alignment shifter 214. As used herein, the term "adding" inherently includes subtraction since the B operand can be a negative number.

Multiplier 212 receives the mantissas of operands A and C and reduces the arithmetic function (A×C) to two intermediate results, known as "sum" and "carry." These intermediate results are provided to a main adder/incrementer 222. Exponent calculator 208 calculates an intermediate exponent from the sum of the exponents of operands A and C and stores the intermediate exponent in an intermediate exponent register 224. Exponent calculator 208 also calculates the difference between the intermediate exponent and the exponent of operand B, and decodes that value to provide control signals to both a leading zero anticipator (LZA) 226 and alignment shifter 214. Alignment shifter 214 shifts the mantissa of operand B so that the exponent of operand B, adjusted to correspond to the shifted mantissa, equals the intermediate exponent. The shifted mantissa of operand B is then provided to main adder/incrementer 222. Main adder/incrementer 222 adds the shifted mantissa of operand B to the sum and carry results of multiplier 212. The output of main adder/incrementer 222 is stored in an intermediate result register 228.

Simultaneously with the mantissa addition in main adder/incrementer 222, LZA 226 predicts the position of the leading one in the result. Since the nature of the arithmetic operation—logical addition or logical subtraction—is known well in advance, LZA 226 may predict the location of the leading one in the result mantissa as being in one of two adjacent bit positions. The left bit position, the most significant bit of the pair, is referred to as the "minimum position" as it represents the minimum shift required for normalization of the result mantissa. Similarly the right bit position, representing the maximum shift required for normalization, is referred to as the "maximum position." For example, if twelve zeroes were predicted to precede the centerpoint of the minimum/maximum bit position pair, the shift amount pair would be either (11,12) for logical addition or (12,13) for logical subtraction. Because the minimum-predicted shift amount must always be selected to ensure that a leading one is not removed from the result, the shift amount used is always based on an encoding of the minimum position of the. predicted bit position pair.

LZA 226 computes a normalize adjust based on the minimum bit position, which is stored in a normalize adjust register 230. The normalize adjust from normalize adjust register 230 is provided, together with the intermediate result mantissa from intermediate result register 228, to a normalizer 232. Normalizer 232 performs the shifting required to place the leading one in the most significant bit position of the result mantissa. The shifted mantissa is then provided to a rounder 234, which rounds-off the result mantissa to the appropriate number of bits.

The normalize adjust from normalize adjust register 230 is also provided to an exponent adder 236. To obtain the proper exponent, the exponent is initially adjusted to correct for the maximum shift predicted by leading zero anticipator 226. If the final result of main adder/incrementer 222 requires only the minimum shift, a late "carry-in" to the exponent adder corrects for the minimum shift amount. To adjust the exponent for the maximum shift predicted, the two's complement of the maximum bit position is added to the intermediate exponent. The addition of the exponent adjust to the intermediate exponent may be initiated as soon as the exponent adjust is available from leading zero anticipator 226, which will typically be before the result from main adder/incrementer 222 becomes available.

The final result mantissa from rounder 234 is combined with the final exponent from exponent adder 236 and forwarded, at output 238, to a result bus (not shown) of floating-point execution unit 10. From the floating-point execution unit's issue multiplexer, the normalized floating-point result may be directly written to a floating-point register or, alternatively, to a designated entry in a rename buffer. In this particular unit, a leading zero overlay (LZO) is generated by logic unit 231, that may prevent the LZA from requesting full normalization. The LZO is based on the intermediate exponent stored in intermediate exponent register 224. See U.S. Pat. No. 5,943,249 for further details.

Determination of leading zeros for binary vectors of relatively short length (e.g. 4 bits long) can usually be accomplished using a Karnaugh map, or other relatively simple Boolean logic. As the binary data field for which this function becomes longer, however (e.g. 32, 64, or 128 bits long), the function can no longer be performed easily in this fashion. The use of two separate functional blocks operating in series (the binary leading-zero counters followed by binary adders to realize the biased count result) requires additional power and integrated circuit area. The difficulty can be compounded in floating-point arithmetic wherein it is necessary to re-normalize the mantissa (shift left to remove all leading zeros). It would, therefore, be desirable to devise an improved method of determining a leading-zero count which used decreased integrated circuit area and power consumption. It would be further advantageous if the method were amenable to high-speed processing, such as when the processor operates at speeds of one gigahertz or more.

SUMMARY OF THE INVENTION

It is therefore one object of the present invention to provide an improved processor for a computer system.

It is another object of the present invention to provide such a processor which performs a leading zero determination in a more efficient manner.

It is yet another object of the present invention to provide an improved method for performing binary leading-zero counting with a constant-biased result.

The foregoing objects are achieved in a method of determining a leading-zero count of a binary value for a floating-point operation, generally comprising the steps of dividing a binary vector into a plurality of subvectors, generating a plurality of subvector leading-zero counts, one for each of the subvectors, and concatenating the subvector leading-zero counts to yield a final leading-zero count for the binary vector. The floating-point operation provides a result which may be shifted by an amount equal to the leading-zero count; for example, the result may be an intermediate mantissa of a floating-point multiply-add operation, and the shifting normalizes the intermediate mantissa. In the preferred implementation, the binary vector has a length of $2^n$, and each subvector has a length of $2^m$, where m is less than n, e.g., the binary vector has 64 bits, and each of the subvectors has 16 bits. The method may further divide each of the subvectors into a plurality of base fields, and generate a plurality of base field leading-zero counts as well. The method also preferably generates several signals, one for each given subvector, which designate whether all bits of a given subvector have a zero value. The concatenating step then uses the subvector leading-zero counts in combination with the signals to calculate a portion of the final leading-zero count. In particular, the concatenating step selects four low bits of the final leading-zero count from four low bits of a most significant subvector leading-zero count whose input data is non-zero. The method may be applied to generate subvector leading-zero counts, and a final leading-zero count, which are biased by a constant amount.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DESCRIPTION OF AN ILLUSTRATIVE EMBODIMENT

Figure 1:
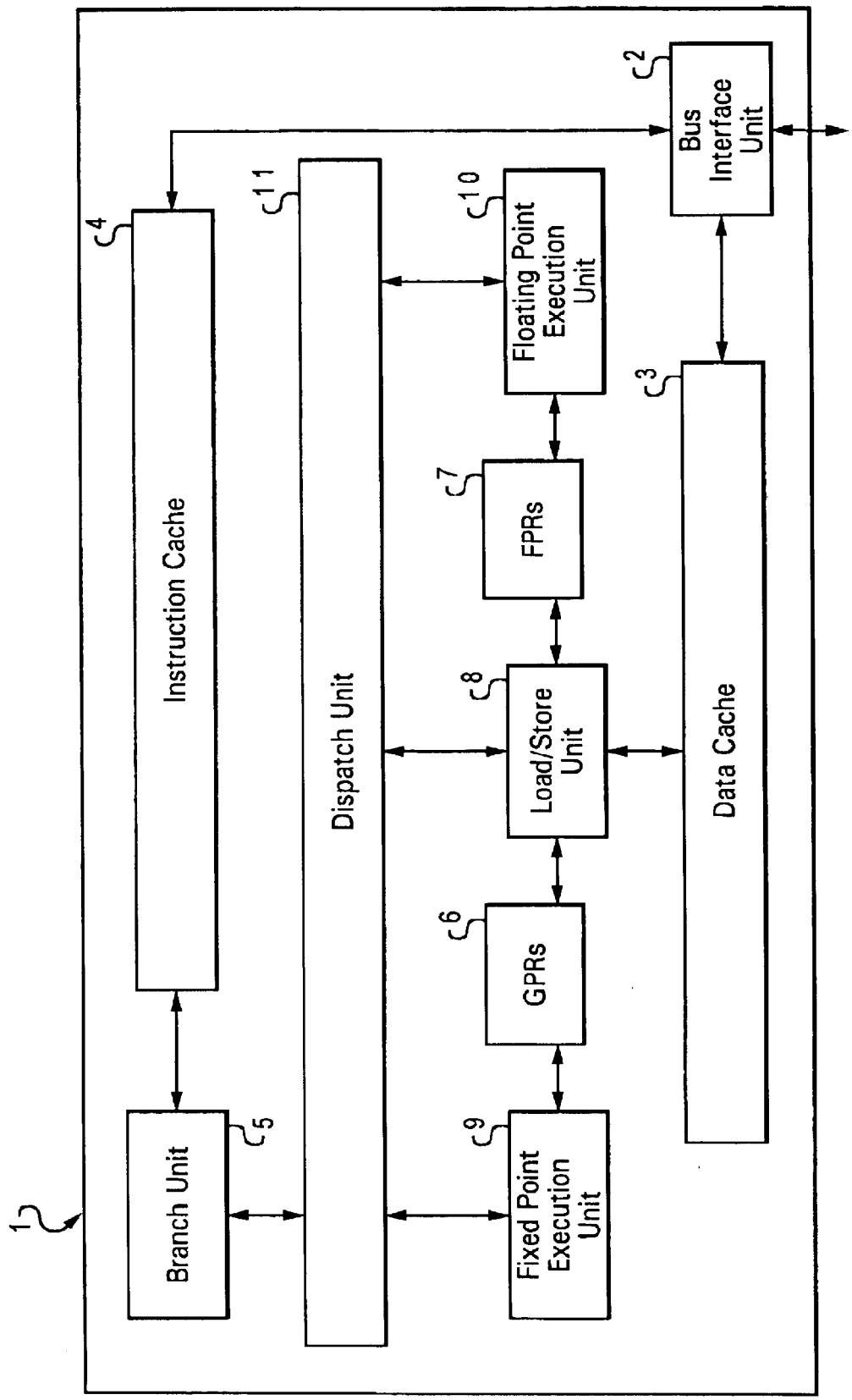
FIG. 1 is a block diagram depicting functional logic units in a conventional computer processor.
Figure 2:
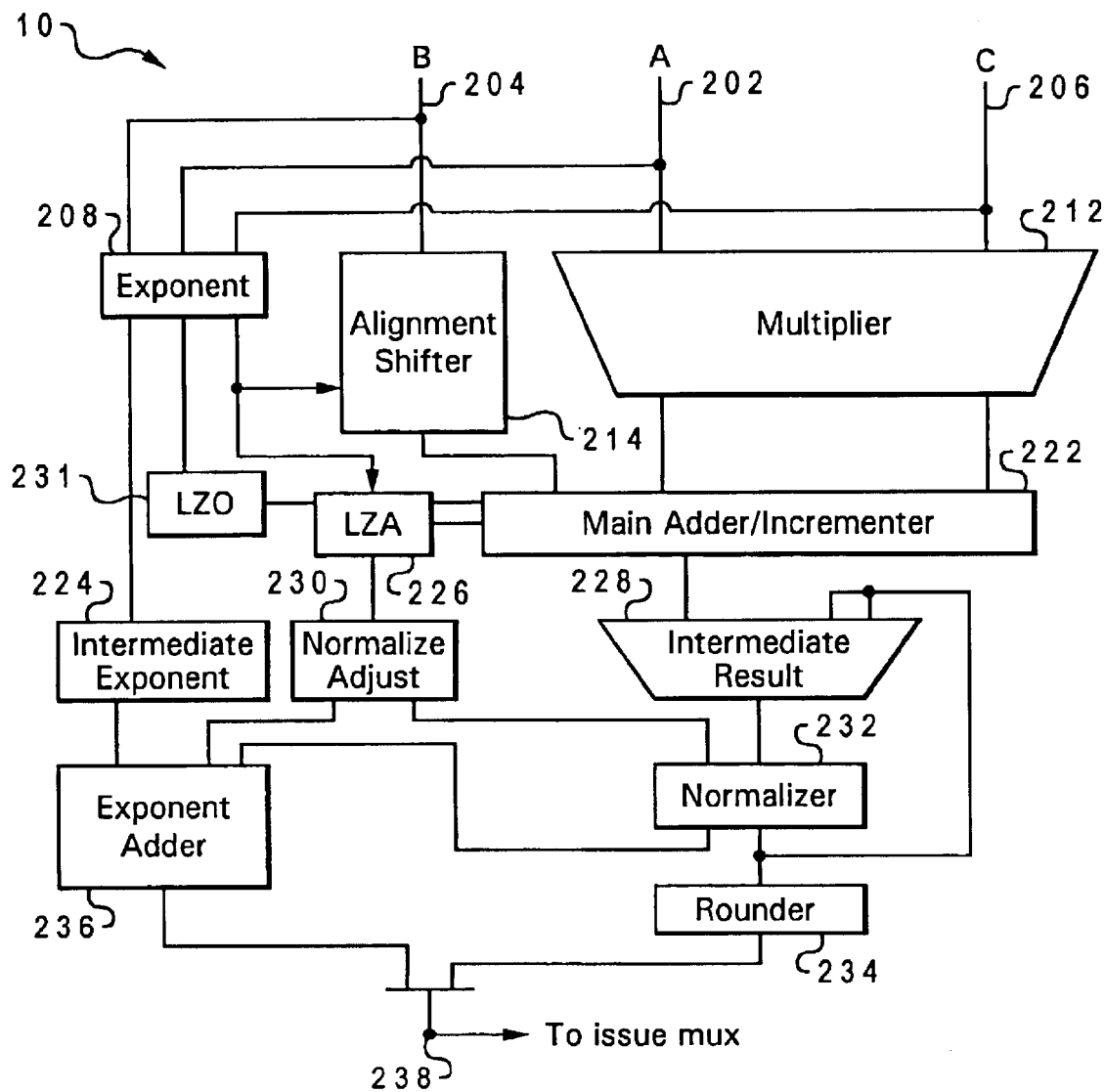
FIG. 2 is a high-level schematic diagram of a prior art floating-point execution unit of a computer processor for performing multiply-add operations which require a determination of leading zeros in a mantissa value.

The present invention is directed to a method of counting leading zeros of a binary mantissa, and is carried out in a processing unit of a computer system. The computer processor may include many of the various components shown in FIGS. 1 and 2, but the processor of the present invention includes new hardware components as well, and could further have a novel interconnection architecture for conventional components. Therefore, while the present invention may be understood with reference to FIGS. 1 and 2, this reference should not be construed in a limiting sense.

Also, while the invention can be applied to generating biased leading-zero counts, it can further be used to generate biased leading one counts. As explained further below, a leading one count may be determined by substituting different encoding logic (or by logically inverting the input data field) to achieve essentially the same effect.

Adding a bias to a vector's leading-zero count is equivalent to actually prepending the original operand vector with a vector of zeros which has the length of the value of the bias itself, then performing a traditional leading-zero count on that new vector. See generally U.S. Pat. No. 5,568,410, which is hereby incorporated for a background discussion, although that patent does not involve the use of a bias. The present invention recognizes that the insertion of the vector of zeros does not necessarily have to be at the "beginning" of the original operand vector, but rather can be inserted anywhere in the operand vector before (more significant than) the most significant one bit in the vector.

This concept may be illustrated by considering the following original operand vector (binary) having a leading-zero count of 16: 00000 00000000 00010010. If a bias of three zeros is to be added to this count, then the three additional zeros may be placed in the vector anywhere preceding the most significant "1" bit. Therefore, each of the following vectors can be considered equivalent (interpreting the three quoted zeros as the inserted "bias" zeros):

"000"00000 00000000 00010010;

00000000 "000"00000 00010010;

00000000 00000000 "000"10010.

In this example, the biased leading-zero count is 19. The invention exploits this nature of being able to effectively insert the "bias" zeros anywhere before the most significant "1" in the binary data field.

To generate the biased leading-zero count (LZC), the operand vector of length $2^n$ is divided into subvectors of length $2^m$, where m<n (m and n are integers). For each subvector, a biased leading-zero count for that subvector can be easily generated, either as mentioned in the Background with simple Boolean logic for very short subvectors, or with a recursive use of the method being described herein which further parallelizes the calculation for improved performance (see example following). The final encoded biased leading-zero count vector is generated as a concatenation of two separately generated subvector encoded count values.

For each subvector, two output signals are generated: an encoded biased leading-zero count signal for that subvector, and a second signal which designates that all bits of the original data field subvector have a zero value. For each subvector, the encoded biased leading-zero count is generated for that length subvector. Consider the example of a 16 bit leading zero count with a bias of 55d. The 16 bit vector will be divided into four subvectors of four bits each.

Total Bias=55d=110111b

Data vector: 0000 0010 1010 1010

Resulting biased Leading Zero Count=61d=0111101b

Maximum possible biased leading zero count=55d+16d= 71d=1000111b

An encoding of each four bit non-biased count would be three bits long (with the highest non-biased result being 4d which equals "100"b). The bias added to each subvector's LZC could be the low "111" from the total bias. It could also be the low "11" from the total bias. This is discussed further below.

The independent subvector's biased leading zero count (LZC) to be used in the biased 16 bit LZC is the count from the most significant subvector whose inputs have non-zero value.

The unbiased and biased leading zero counts for each subvector is as follows:

| Subvector | "0" | "1" | "2" | "3" |
|---|---|---|---|---|
| | 0000 | 0010 | 1010 | 1010 |
| unbiased LZC | 4d = 100b | 2d = 010b | 0d = 000b | 0d — 000b | biased (+111b)LZC 11d=1011b 9d=1001b 7d=0111b 7d=0111b biased (+11b)LZC 7d=111b 5d=101b 3d=011b 3d=011b For this example, the bias used is "+111b".

One can see that the most significant subvector whose input data is non-zero is that marked "1". Certainly either biased count for subvector "1" (9d or 5d) is not sufficient to represent the biased leading zero count for the entire 16 bit vector as there are four zeros preceding this subvector. Thus, in the general case, the biased 16 bit LZC for the entire 16 bit vector could require the addition of 0d, 4d, 8d, 12d, or 16d to the chosen subvector's biased LZC.

Because the binary "fours" and eights" positions could be affected by this required addition of the count of preceding zeros, only the lesser significant positions (binary "ones" and "twos") can be directly chosen from the selected subvector's ("1") biased LZC as part of the final biased LZC for the original 16 bits ("01b" in this example). (In the event that all the data inputs are "0b", the two low bits of the biased LZC for the lowest subvector should be chosen as part of the final biased 16 bit LZC.)

Thus, it can be reasoned that only the lowest "11b" of the bias added to each subvector's LZC directly affects these two count bits which are to be selected as biased 16 bit LZC bits. In fact, adding fewer bits than the lowest "11b" of the bias value to each subvector's LZC could result in required additional modification of the selected biased LZC before considering its bits as part of the biased 16 bit LZC.

Bias bits more significant than the lowest "11" can either be considered in the subvector's LZCs or can be considered separately to generate the upper bits of the biased 16 bit LZC.

Finally, the high five bits of the biased 16 bit LZC are generated by considering the most significant bits (MSBs) of the subvector's unbiased LZCs, remaining high order bits of the chosen subvector's biased LZC not already taken for the final biased 16 bit LZC, and any portion of the total bias vector which was not used to bias the subvector LZCs.

In the above example, the unused portion of the total bias is "1101b" which is really 52d considering the bit positions (assuming one biased the subvector LZCs with "11b"). It follows that the five MSBs of the biased 16 bit LZC equate to one of the following values: 52d, 56d, 60d, 64d, or 68d (recalling from above the required consideration that the chosen subvector LZC may be preceded by subvectors having all zero inputs, or all data inputs are zeros). Here, the only subvector preceding the subvector whose biased LZC was chosen earlier is that labeled "0". In this case, subvector "1"s non-biased MSB is "1b" indicating that the subvector was all zeros. The biased LZC's MSB for subvector "1" (that chosen) is also "1b". Each of these "1b"s indicate that a value of four must be added to the aforementioned "1101b". Thus, a total of "8d" (4×2) must be added to the "1101b". This results in "1111b", accounting for the weighting of the bits in "1101b". It can be seen that generally, the logic required to resolve the upper bits of the final biased 16 bit LZC is relatively simple.

The "prefixed" bits of the final biased LZC are the unused portion (which may be zero in the case where the total bias vector is smaller in magnitude than a possible encoded unbiased LZC of the original data) of the total bias vector with the addition of the count of the zeros preceding the most significant subvector's LZC.

More generally, the more significant subvector of the final biased leading-zero count is generated by performing relatively minimal logic on (i) the remaining upper portions of the encoded subvector biased leading-zero counts, (ii) the signals which were generated for each subvector indicating that the subvector itself was all zero valued, and (iii) any bits of the total bias constant that were not taken into account in the original subvector biased leading zero counts (for example the leading "11" which was truncated from the 55 value in the above example). A significant feature of the present invention is that both biased leading-zero count data and unbiased-based full zero detect data are used to calculate a portion of the final biased leading-zero count. This feature embodies the concept described earlier wherein the zeros that constitute the bias value are effectively inserted in the original data field based on the value of the data field itself.

As the bias becomes large to the extent that its encoded length exceeds that of the subvector length chosen, it can be said that the zeros inserted into the data field to conceptually represent the bias are in essence inserted in two locations in the data field. The first location is as described earlier, being just before the most significant subvector which includes non-zero data. The second location can be considered to be anywhere more significant than the first location, including just to the left of the first location, as the generation of the more significant subvector of the final biased leading-zero count is done in a single encoding block incorporating the aforementioned data.

An illustrative hardware implementation of the foregoing method is depicted in FIGS. 3 through 8. This implementation is directed to a design having a 64-bit binary leading-zero counter generating a count biased by a decimal value of seven (7). For this design, the invention method is utilized recursively-such that the initial 64-bit data field is divided into 16-bit subvectors to which the described method is applied. The inventive method is utilized in generating the biased leading-zero counts on each 16-bit subvector. The method is then again used to generate the final biased leading-zero count for the original 64-bit data field using the aforementioned biased leading-zero counts from each 16-bit subvector.

Figure 3:
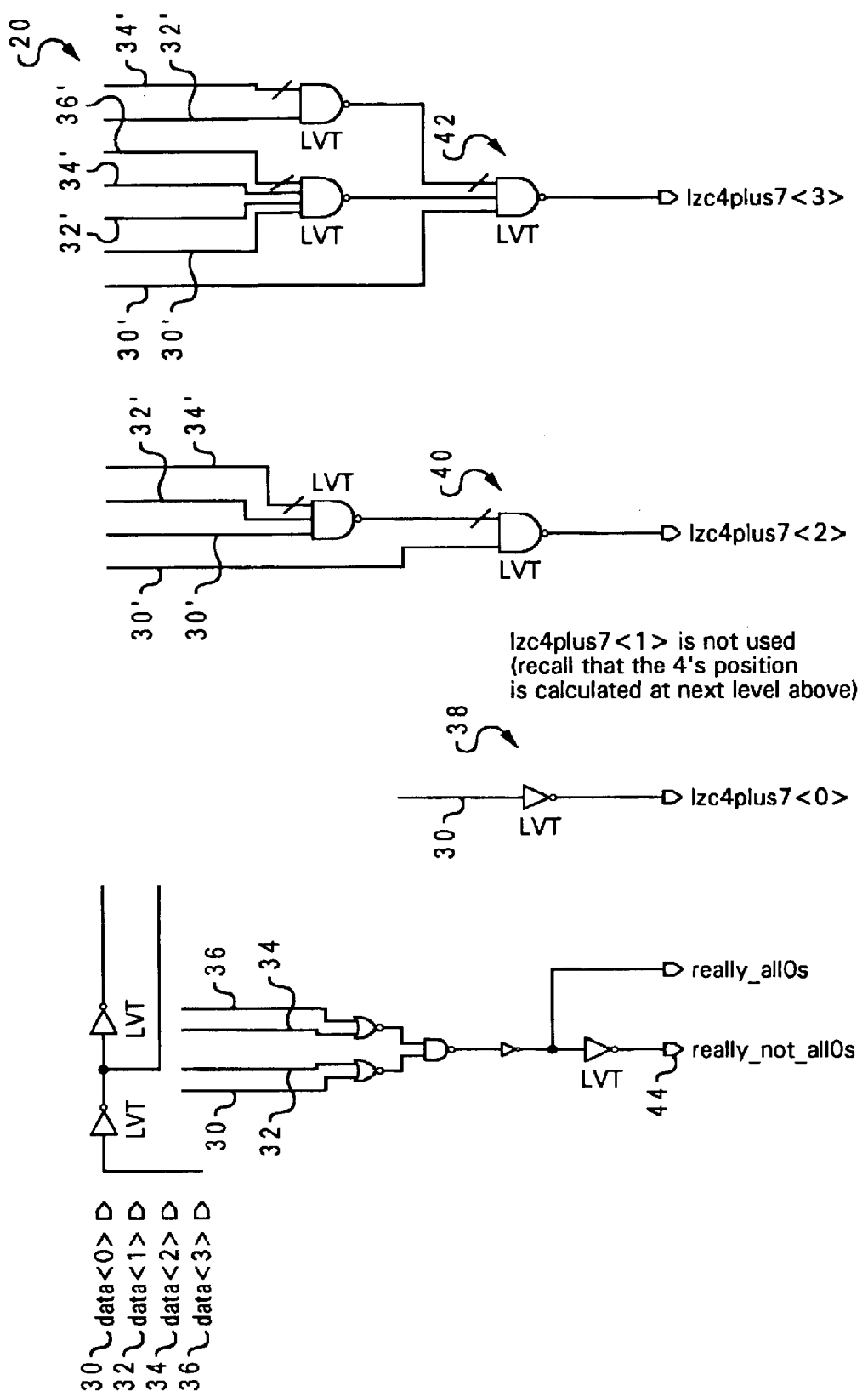
FIG. 3 is a detailed schematic diagram of a leading-zero count (LZC) generator for a 4-bit base field in accordance with one implementation of the present invention.

With reference now to FIG. 3, a data field of 16 bits is divided further into four 4-bit base fields (sub-subvectors), and an LZC base field circuit 20 is provided for each base field. A given base field is identified by data lines 30, 32, 34 and 36. The complements of these data lines are indicated by 30',32', 34', and 36'. For each 4-bit base field, a biased LZC is generated encoding in the bias of 7 decimal ("0111") into the logic. In this example, the second most significant encoded biased LZC bit (bit 1) is not necessary in the logic and is therefore not shown, but the encoding for LZC bits 0, 2 and 3 is illustrated at 38, 40 and 42. An additional signal 44 is generated designating whether all four input data bits were zero valued.

Figure 4:
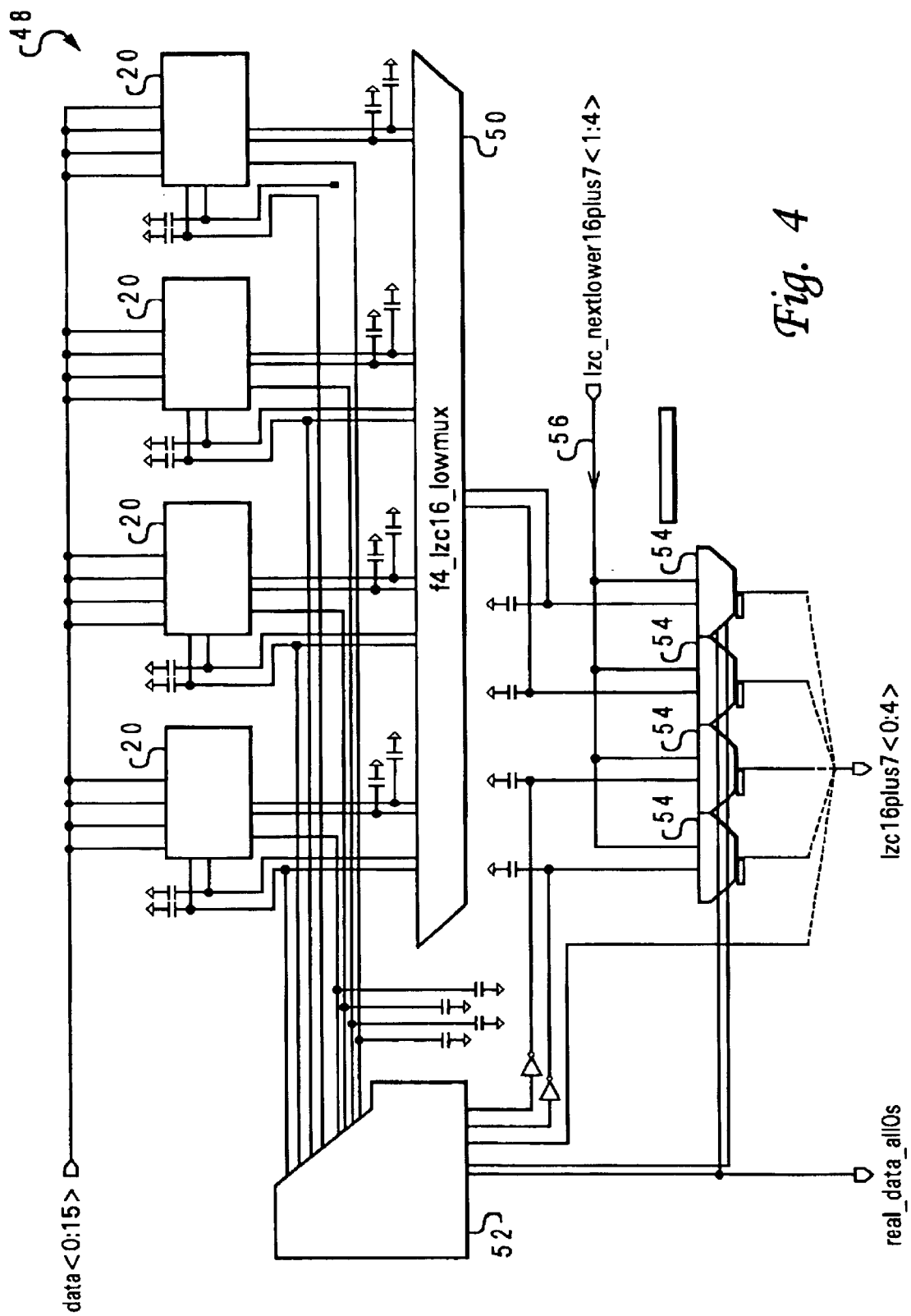
FIG. 4 is a high-level schematic diagram of a circuit used to generate LZC bits for a 16-bit subvector in accordance with one implementation of the present invention.

With further reference to FIG. 4, a circuit 48 is used to generate the LZC bits for a given 16-bit subvector. The outputs from each 4-bit leading-zero counter 20 are provided as inputs into a multiplexer 50 which selects the lowest two bits from the most significant LZC bit of circuits 20 that has non-zero input data. Logic circuit 52, which also receives inputs from LZC circuits 20, generates the upper portion of the biased LZC for the 16-bit subvector. A plurality of multiplexers 54 perform the same function as multiplexer 50, for the 64-bit LZC which utilizes this circuit 48. In other words, the multiplexers 54 not only receive inputs from multiplexer 50 and circuit 52, but further from the next lower 16 bits (biased by 7) as indicated at 56.

Figure 5:
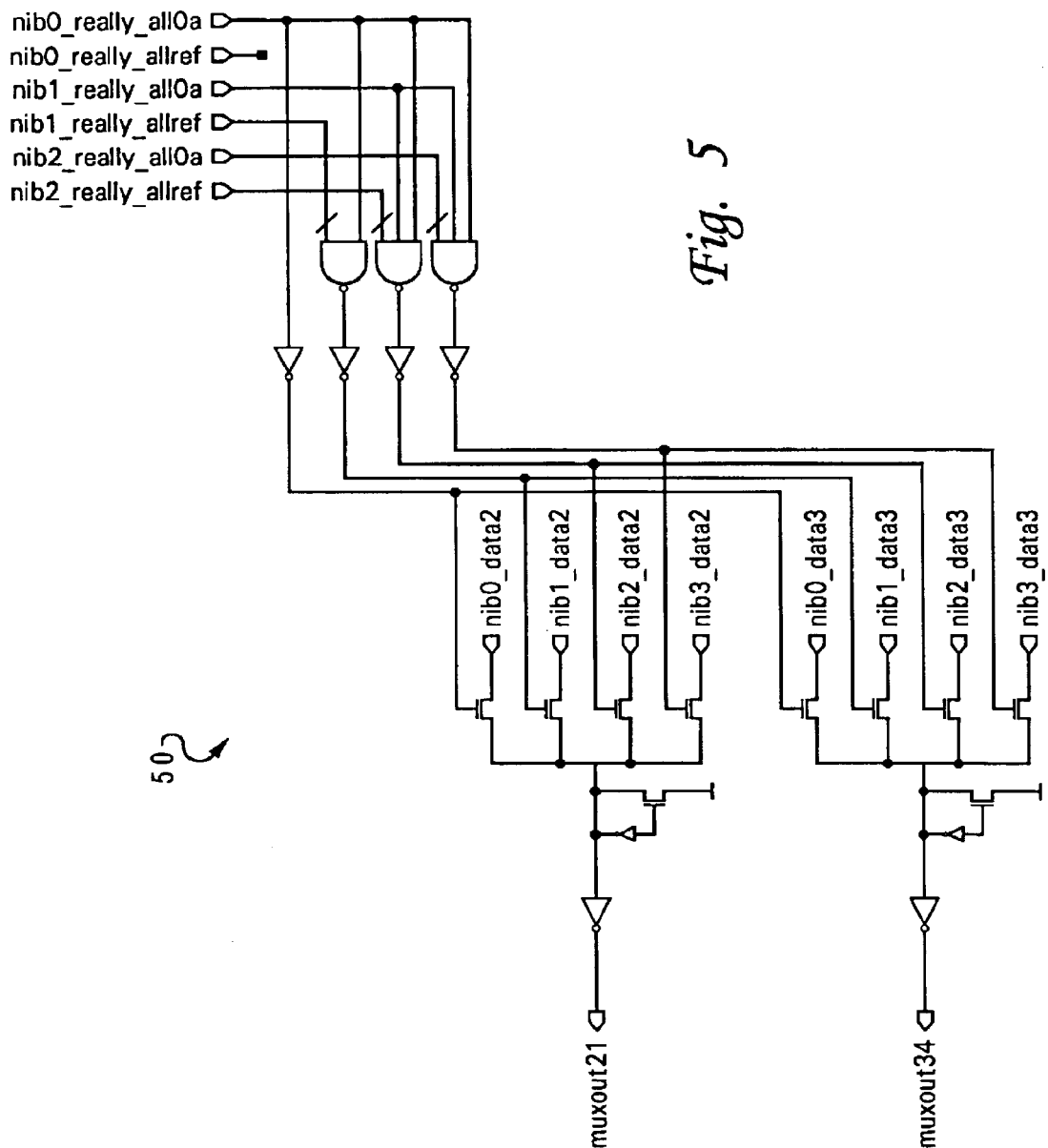
FIG. 5 is a detailed schematic diagram of a multiplexer used in the circuit of FIG. 4.

FIG. 5 illustrates multiplexer 50 which selects the low bits for the biased LZC based on the signals for each subvector indicating whether the inputs to those subvectors are all zeros. All inputs are derived from blocks 20.

Figure 6:
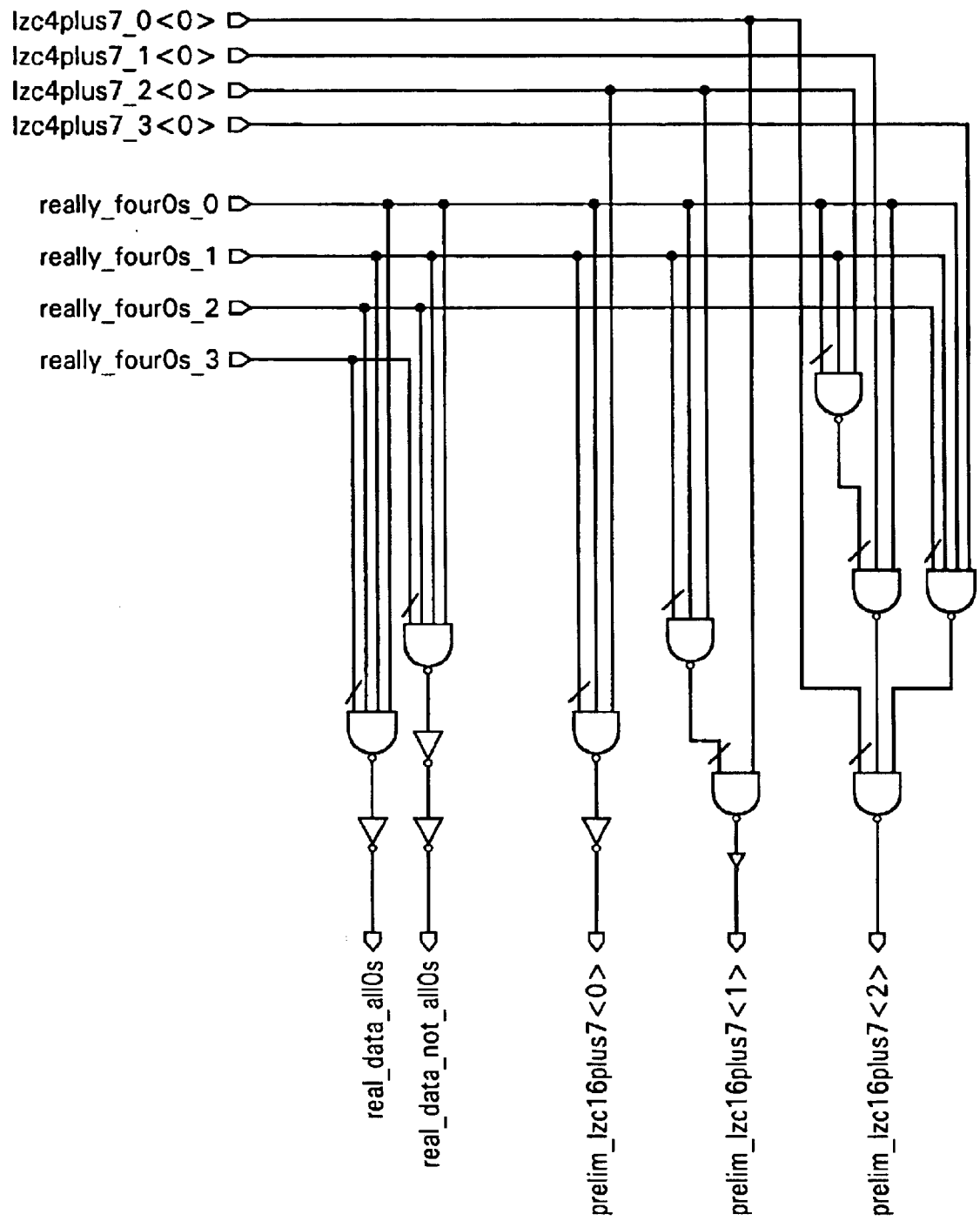
FIG. 6 is a detailed schematic diagram of a logic circuit for generating the upper three bits of a biased LZC for the 16-bit subvector, for use with the circuit of FIG. 4.
Figure 7:
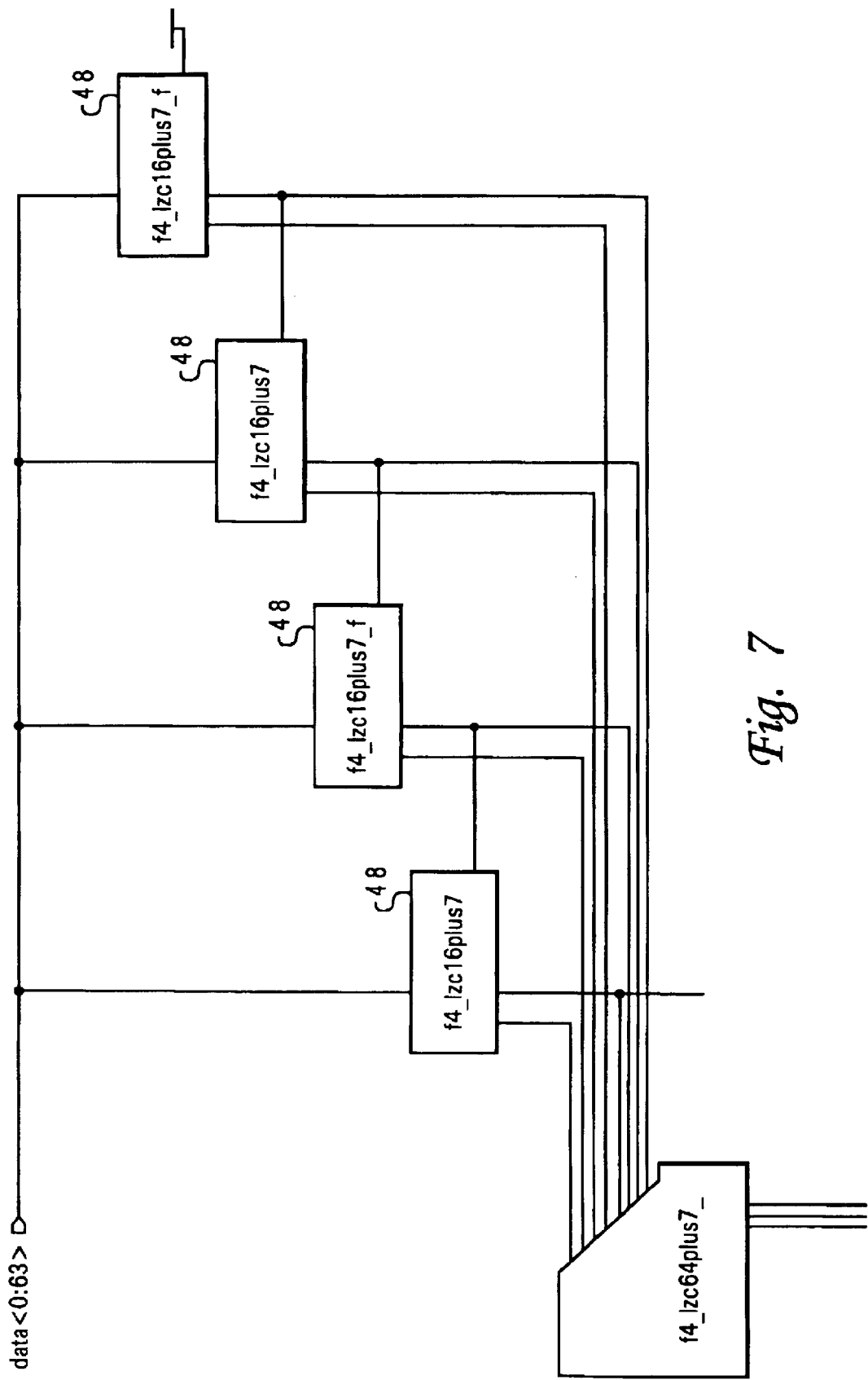
FIG. 7 is a high-level schematic diagram of a circuit used to generate a final encoded biased LZC for a 64-bit binary vector in accordance with the implementation of FIGS. 3–6.

Referring now to FIG. 6, the logic that is required to generate the upper three bits of the biased LZC for the 16-bit subvector, with the bias value of 7, is illustrated. All inputs are from blocks 20, i.e., the most significant bits of the unbiased LZCs and the high bits of the biased LZCs.

Once the LZC bits have been generated for each 16-bit subvector, the biased LZC may be generated for the entire 64-bit vector. The low four bits of the final biased LZC come from the low four bits of the most significant 16-bit subvector's biased LZC whose input data was non-zero. This selection occurs in a cascading fashion via the multiplexers 54 shown in FIG. 4. This process is different from the generation of the biased LZC for each 16-bit subvector where the multiplexing of the low bits is done in a single stage (FIG. 5), where physically localized circuits can be designed. At this top level, illustrated in FIG. 7, there would be difficulty in centralizing the multiplexing circuits of the low four bits, as this would be used for datapath operation. The RC delays involved in centralizing the multiplexing, and the complexity of the multiplexing itself would reduce the efficiency of the circuit using current IC technology, but this is not meant to be construed in a limiting sense.

Figure 8:
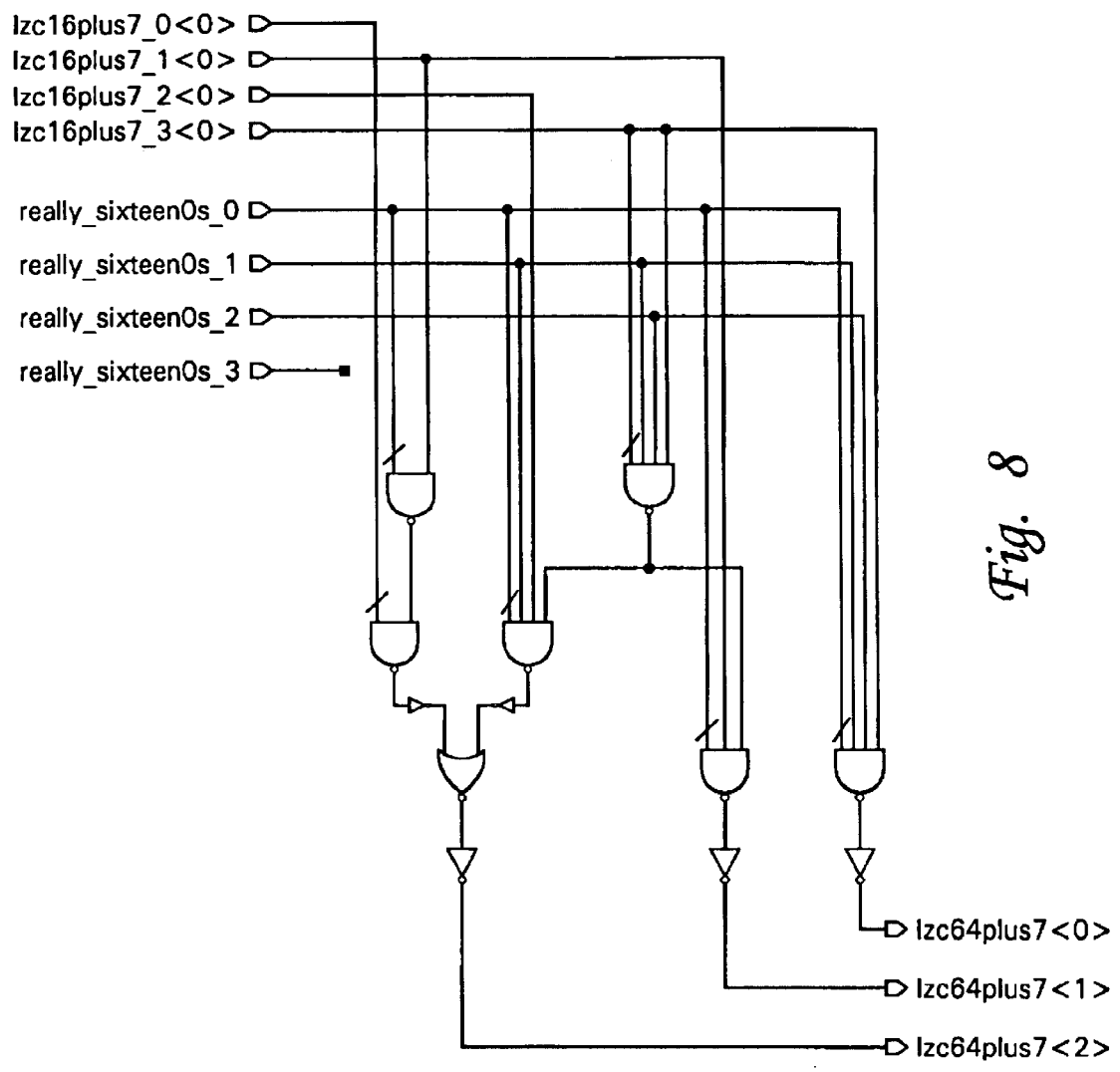
FIG. 8 is a detailed schematic diagram of a logic circuit used to generate the uppermost three bits of the final encoded biased LZC as implemented in FIG. 7.

The outputs of each LZC subvector generator 48 are combined via logic circuit 70, further illustrated in FIG. 8, to generate the uppermost three bits for the final encoded biased LZC for the original 64-bit data field (given the bias constant of 7). For other constants, the logic may be different, but generally does not become complicated. As the bias constant becomes much larger in magnitude than the length of the data field itself, the encoded bias value's length may be longer than length of the encoded length of the data field. In this case, this same method described herein may be used, but the most significant subvector of the final biased LZC becomes the most significant subvector of the encoded bias itself, or that subvector incremented by one. In this case, the designer can generate that portion of the result by multiplexing either the upper bits of the bias itself, or a pre-calculated, incremented version of that subvector, selecting between the two based on detection logic utilizing pre-existing signals.

A primary advantage of the present invention is improved calculation performance, i.e., higher-speed. Additionally, the invention requires less integrated circuit area consumption, and less power, as the number of circuits to accomplish this integrated function are fewer than when performing the individual functions of leading-zero counting and binary addition separately and in series.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. It is therefore contemplated that such modifications can be made without departing from the spirit or scope of the present invention as defined in the appended claims.

What is claimed is:

1. A method of determining a biased leading-zero count of a binary value for a floating-point operation, said method comprising:

dividing a binary vector into a plurality of subvectors;

generating a plurality of subvector leading-zero counts, one for each of said subvectors, wherein said subvector leading-zero counts are biased by a constant amount, wherein said generating further includes dividing each of said subvectors into a plurality of base fields; and generating a plurality of base field leading-zero counts, one for each of said base fields;

calculating one or more prefix bits by adding a second portion of said bias amount to a number of zeros preceding a selected one of the subrector leading-zero counts; and concatenating at least a portion of the selected subvector leading-zero count to said one or more prefix bits to yield a final leading-zero count for said binary vector.

2. The method of claim 1 wherein the floating-point operation provides a result, and further comprising the step of shifting the result by an amount equal to the leading-zero count.

3. The method of claim 2 wherein the result is an intermediate mantissa of a floating-point multiply-add operation, and said shifting step normalizes the intermediate mantissa.

4. The method of claim 1 wherein the binary vector has a length of 2n, and said dividing step divides the binary vector into subvectors each having a length of 2m, where m and n are integers, and m is less than n.

5. The method of claim 4 wherein the binary vector has 64 bits, and each of the subvectors has 16 bits.

6. The method of claim 1 wherein said generating step includes the step of generating signals, one for each given subvector, which designate whether all bits of a given subvector have a zero value.

7. The method of claim 6 wherein said concatenating step further uses at least two of the signals to calculate a portion of the final leading-zero count.

8. A circuit for determining a biased leading-zero count of a binary value for a floating-point operation carried out in a data processor, said circuit comprising:

means for dividing a binary vector into a plurality of subvectors;

means for generating a plurality of subvector leading-zero counts, one for each of the subvectors using a first portion of a bias amount, wherein said generating means further includes means for dividing each of said subvectors into a plurality of base fields; and means for generating a plurality of base field leading-zero counts, one for each of said base fields;

means for calculating one or more prefix bits by adding a second portion of said bias amount to a number of zeros preceding a selected one of said subrector leading-zero counts; and means for concatenating at least a portion of the selected subrector leading-zero count to said one or more prefix bits to yield a final leading-zero count for said binary vector.

9. The circuit of claim 8 wherein the floating-point operation provides a result, and further comprising means for shifting the result by an amount equal to the leading-zero count.

10. The circuit of claim 9 wherein the result is an intermediate mantissa of a floating-point multiply-add operation, and said shifting means normalizes the intermediate mantissa.

11. The circuit of claim 8 wherein the binary vector has a length of 2n, and said dividing means divides the binary vector into subvectors each having a length of 2m, where m and n are integers, and m is less than n.

12. The circuit of claim 11 wherein the binary vector has 64 bits, and each of the subvectors has 16 bits.

13. The circuit of claim 8 wherein said generating means further generates signals, one for each given subvector, which designate whether all bits of a given subvector have a zero value.

14. The circuit of claim 13 wherein said concatenating means further uses at least two of the signals to calculate a portion of the final leading-zero count.

15. The circuit of claim 8 wherein said generating means generates subvector leading-zero counts which are biased by a constant amount.

* * * * *